Figure 1:
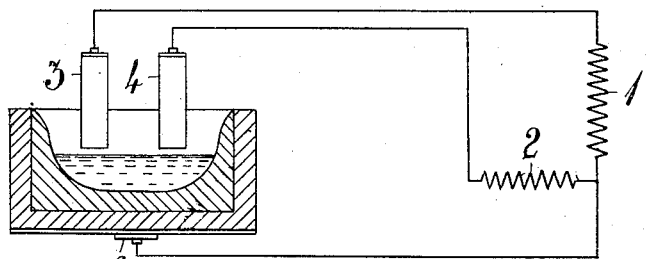

A. R. LINDBLAD.
METHOD OF ELECTRIC PRODUCTION OF IRON AND STEEL AND OTHER METALS.
APPLICATION FILED MAR. 6, 1909.

1,002,286.

Patented Sept. 5, 1911.

2 SHEETS—SHEET 1.

Witnesses:

Inventor:
Axel Rudolf Lindblad,
By his Attorney,

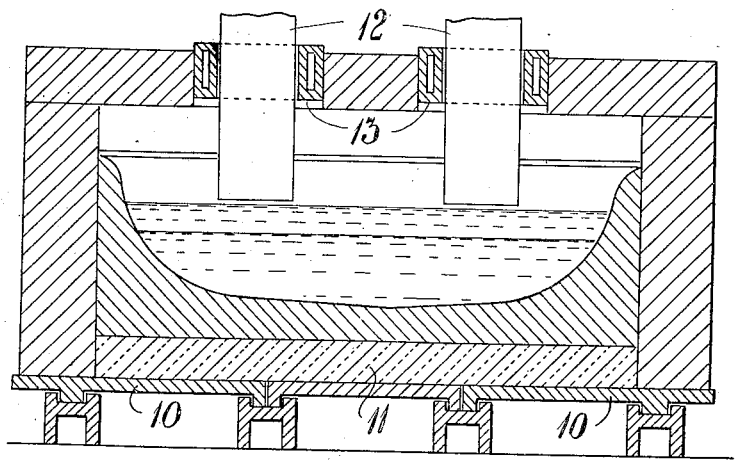
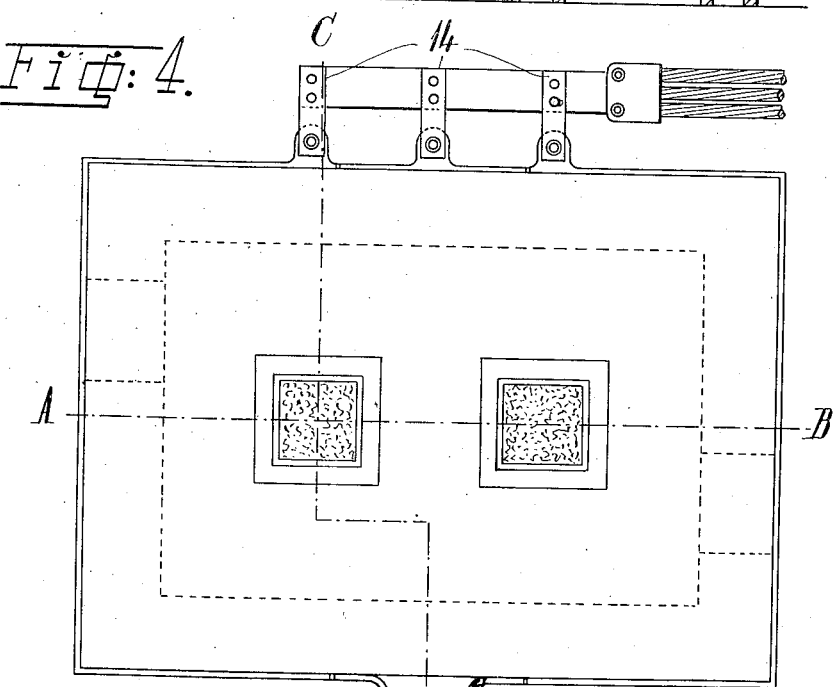

UNITED STATES PATENT OFFICE.

AXEL RUDOLF LINDBLAD, OF LUDVIKA, SWEDEN.

METHOD OF ELECTRIC PRODUCTION OF IRON AND STEEL AND OTHER METALS.

1,002,286.  Specification of Letters Patent.  Patented Sept. 5, 1911.

Application filed March 6, 1909. Serial No. 481,756.

*To all whom it may concern:*

Be it known that I, AXEL RUDOLF LINDBLAD, engineer, a subject of the King of Sweden, residing in Ludvika, in the Kingdom of Sweden, have invented certain new and useful Improvements in Methods of Electric Production of Iron and Steel and other Metals, of which the following is a specification.

In electric production or smelting of metals, iron and steel for example, there is used, as is known, the method of proceeding, that the current from an electrode hanging down in the furnace passes in the form of an electric arc to the smelting bath or to the layer of slag floating thereon and then from the smelting bath either through a bottom-contact back to the source of the current or else in the form of an electric arc to another electrode hanging down in the furnace and from this electrode back to the source of the current, in which latter case the tension must be twice as great, as the two arcs are coupled in series. Both these methods of procedure presuppose, however, single-phase alternating currents. Multi-phase alternating currents, however, offer important advantages both in generation and in transmission to the place where it is to be used. For these reasons it is very desirable to be able to use multi-phase currents direct in the electric smelting furnace and many proposals have been made in this direction. But in these proposals, however, it has always been presupposed that the number of adjustable electrodes used should be as great as the number of terminals of the poles in the current-system, i. e. in three-phase currents, three, in two-phase, four, etc. This large number of adjustable electrodes has, especially in the case of small furnaces, occasioned difficulties and hindered their employment.

The present invention relates to a method which makes it possible to use multi-phase currents without it being necessary to increase the number of adjustable electrodes beyond that hitherto employed in furnaces for single-phase currents.

The invention is principally characterized thereby, that the furnace is supplied with two-phase current in such a way that the terminals of one pole of the two phases are each electrically connected with one of two adjustable electrodes which hang down in the furnace, while the terminals of the other pole of the two phases are together electrically connected with the conducting lining itself of the furnace or else with any other electrode which is in direct contact with the smelting bath. From the two adjustable electrodes the current passes to the smelting bath in the form of an electric arc.

Figure 2:
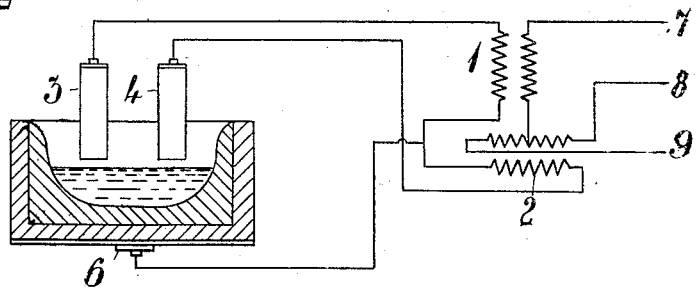
Figure 5:
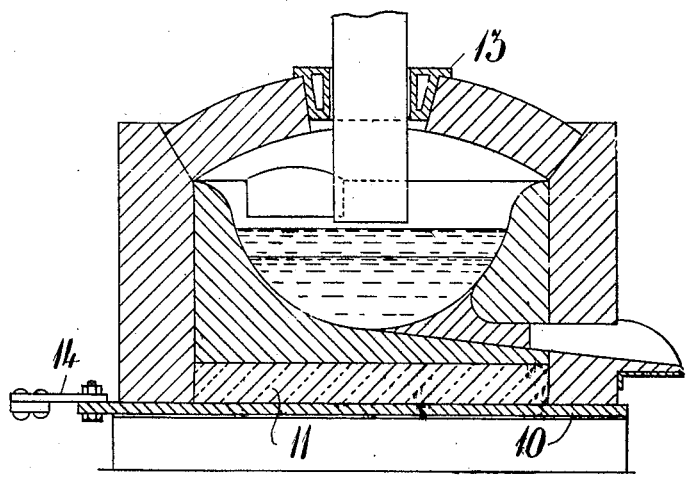

In the accompanying drawings the schematic Figure 1 illustrates this connection. Fig. 2 illustrates in the same way a modified form of the connection. Fig. 3 shows a modified section on the line A—B of Fig. 4, and Fig. 4 is a plan view. Fig. 5 is a sectional view of the furnace, on line C—D, Fig. 4.

In Fig. 1, 1 and 2 represent the two phases in a two-phase system where the one ends of the phases are electrically connected with each other. The current system is thus interlinked. Each of the two phases is connected with a corresponding electrode 3 or 4 respectively, from which the current passes in the form of an electric arc to the smelting bath where it combines itself to a resultant current which passes through the conducting lining to the contact 6 and thence again to the source of the current. As the two circuits have a difference of phases of 90° relatively to each other, it is clear that the resultant current which passes through the smelting bath and contact 6 will be $\sqrt{2}$ times greater than the current which passes through each of the electrodes 3, 4, and also that the tension between the two electrodes should be $\sqrt{2}$ times that tension which is consumed in each arc. It is also clear without further explanation that, as nearly the whole of the tension is consumed in the arcs, the current system will be balanced and the two phases equally loaded.

If there is a three-phase current it can be transformed to two-phase current by means of the well-known Scott's connection in the transformer belonging to the furnace. The diagram will in that case be as shown in Fig. 2, where 7, 8 and 9 are the three conducting wires from a three-phase system, the other ciphers in this figure indicate the same parts as in Fig. 1.

The furnace is built on iron plates 10 which at the same time serve as conductors for the resulting current of the phases, for which purpose they are connected with the conductors 14. The walls are constructed in the usual way. When soft iron or steel is to be produced the lining consists of a mass of magnesite, dolomite or quartz or the like. As these substances, being conductors of the second class, must, as a rule, be of a rather high temperature in order to conduct electricity sufficiently, a layer 11 of a mass, for example, graphite, which acts insulating against heat but even when cold is conducting the electric current, would be rammed in on the plates 10. By this means the lining itself is kept constantly warm and conductive. In case the lining consists of magnesite or dolomite with tar, pitch or the like as an adhesive, said lining, on account of the amount of carbon introduced with the adhesive, is usually a sufficiently good conductor even in a cold condition. The heat-insulating layer 11 can then, if desired, be left out; 12 are the two electrodes which are connected with the free ends of the phases. These electrodes hang down through the cupola of the furnace and are arranged adjustably and they are surrounded, on their passage through the brickwork, by cooling casings 13. The electrodes are adjusted so, that between them and the smelting bath or the slag-layer floating on the latter, there is formed an electric arc of suitable length. It is moreover plain that the constructive details of the furnace can be carried out in many different ways and can be arranged according to circumstances.

With this furnace all processes occurring in the production of iron and steel can be carried out, such as puddling, desulfuration, dephosphoration, etc.

As the bottom-contact, as described above, can consist of the lining itself, it is clear that the same will not cause any important costs or trouble. The advantages however, over other known methods offered by the present invention, are, on the other hand, of great importance. Above all, the multi-phase currents can be used direct in the furnace, whereby both the generating and the transmission of power becomes cheaper, and, as most of the existing alternate current plants work with multi-phase currents, it is of course advantageous to be able to adapt smelting furnaces to already existing current-systems. Besides this, multi-phase currents cause a powerful circulation in the smelting bath, whereby the process is greatly accelerated.

Having thus described my invention, I declare that what I claim is:—

Method of producing or smelting of iron, steel or other metals in electric furnaces characterized thereby, that the electric energy is supplied in form of two phase alternating current in such a way that the terminals of the one pole of the both phases are each connected with one of two adjustable electrodes, hanging down into the furnace from which electrodes, the electric current, in form of electric arcs passes to the smelting bath, the terminals of the other pole of the two phases being together electrically connected with the conducting lining of the furnace or directly put in contact with the smelting bath.

In witness whereof, I have hereunto set my hand in presence of two witnesses.

AXEL RUDOLF LINDBLAD.

Witnesses:
J. M. HELIN,
J. E. SCHULTZBERG.